Patented Feb. 21, 1939

2,148,140

UNITED STATES PATENT OFFICE 2,148,140

DEHYDROGENATION OF PARAFFIN HYDROCARBONS

Hans Tropsch, Chicago, Ill., assignor to Universal Oil Products Company, Chicago, Ill., a corporation of Delaware No Drawing. Application January 25, 1935, Serial No. 3,473

6 Claims. (Cl. 260—683)

This invention relates to the treatment of paraffin hydrocarbons which are normally gaseous including ethane, propane and the butanes.

In a more specific sense the invention is concerned with a process for converting these low boiling members of the paraffin series of hydrocarbons into their corresponding olefins which contain two atoms of hydrogen less per molecule and consequently have one double bond between carbon atoms.

There is a large commercial production of gaseous paraffin hydrocarbons. They occur in very large quantities in natural gas, particularly those gases associated with the production of crude oil and commonly known as casing head gases and this supply is further augmented by the gases producel in cracking oils for the production of gasoline although this latter type of pyrolytically produced gas contains substantial quantities of olefins as well as paraffinic hydrocarbons. The greater part of the paraffin gas production is used merely for domestic and industrial fuel purposes and not as a source of hydrocarbon derivatives on account of the unreactive character of its components in comparison with their olefinic counterparts.

In one embodiment the invention comprises the dehydrogenation of gaseous paraffin hydrocarbons at elevated temperatures in the presence of catalysts comprising essentially magnesium oxide and promoters.

In the present instance the catalyst mixtures which are preferred for selectively dehydrogenating the lower boiling paraffinic hydrocarbons have been evolved as the result of a large number of experiments with catalysts having a dehydrogenating action upon various types of hydrocarbons such as are encountered in the fractions produced in the distillation of petroleum and other naturally occurring hydrocarbon oil mixtures. The criterion of an acceptable dehydrogenating catalyst is that it shall split off hydrogen without inducing either carbon separation or scission of the bonds between carbon atoms. In the concept of the present invention, catalyst mixtures comprising major amounts of magnesium oxide and minor amounts of promoting salts, particularly of the heavy metals and the alkali metals, have been found to be particularly valuable and efficient, although some salts of the alkaline earth metals may also be used. While magnesium oxide alone is a fairly good dehydrogenating catalyst in the above sense, the tendency to selective splitting off of hydrogen on the one hand and to carbon deposition on the other hand has been found to be lessened by the use of the present type of activators so that the dehydrogenating action is rendered more definite and effective.

The mineral magnesite from which magnesium oxide is conveniently prepared to furnish base material for the present type of catalyst is most commonly encountered in a massive or earthy variety and rarely in crystal form, the crystals being usually rhombohedral. In many natural magnesites, the magnesium oxide may be replaced to the extent of several percent by ferrous oxide. The mineral is of quite common occurrence and readily obtainable in quantity at a reasonable figure. The pure compound begins to decompose to form the oxide at a temperature of 350° C. (663° F.), though the rate of decomposition only reaches a practical value at considerably higher temperatures, usually of the order of 800° C. (1472° F.) to 900° C. (1652° F.). This mineral is related to dolomite, the mixed carbonate of calcium and magnesium, this latter mineral, however, not being of as good service as the relatively pure magnesite in the present instance. Magnesium carbonate prepared by precipitation or other chemical methods may be used alternatively in place of the natural mineral, thus permitting its use as the active constituent of masses containing spacing materials of relatively inert character and, in some cases, allowing the production of catalysts of higher efficiency and longer life.

The promoters which are used along with magnesite according to the concepts of the present invention include several classes of materials, principally salts of the alkali metals and heavy metals although the invention may also employ compounds of the alkaline earth metals. Active catalytic masses have been prepared by properly adding salts of the following acids to burnt magnesite: chromic, boric, carbonic, molybdic, pertitanic, permanganic, aluminic, phosphoric, perrhenic, etc. The method of addition of any given salt or its residue resulting from calcination, such as an oxide or a sulfide, will vary with the physical and chemical properties of the material, particularly with its solubility in water. The numerous alternative catalysts which may be prepared according to various processes, some of the details of which will be disclosed in succeeding paragraphs, have distinct and peculiar activity when employed in dehydrogenating paraffinic gases and are not exactly equivalent in their action although substantially all possess sufficient catalyzing power to warrant their use in practice. The selection of any particular magnesium oxide-promoter catalyst will be determined by cost considerations and the efficiency of the selected catalyst upon the dehydrogenating reaction being dealt with.

To prepare the magnesium oxide for use as base material for preparing catalysts for the process, the corresponding carbonate obtained either from natural sources or by precipitation reactions is preferably heated for variable periods of time at temperatures in the neighborhood of 800° C. (1472° F.) which insures the decomposition of most of the carbonate to oxide. The conditions of time and temperature employed in calcining any particular carbonate mineral will depend, to a large extent, upon its physical and, to a smaller extent, upon its chemical composition. Magnesite may contain at times several percent of ferrous oxide in isomorphous mixture with magnesium oxide and since its occurs in nature in a harder and more compact variety than the precipitated carbonate, it may require different conditions of time and temperature to reduce substantially all of it to the desired oxide.

The mineral oxide of magnesium may sometimes be employed (this oxide being known as periclase) whenever the same is readily available and its physical properties as well as its content of impurities permits. The mineral oxide occurs in granular form or in definite cubic or octahedral crystals and may contain in many cases besides relatively inert siliceous gangue materials small amounts of iron and manganese replacing a portion of the magnesium.

The present invention as previously intimated contemplates the use of a considerable number of alkali and heavy metal salts as sources of promoter material. The alkali metals include, of course, sodium, potassium, lithium, rubidium and caesium. Substantially all of the alkali metal salts are sufficiently soluble in water so that they may be conveniently employed in solutions from which magnesium oxide absorbs them. Obviously, it will be commercial practice to use salts of the more ordinary alkali metals sodium and potassium rather than those of the other three members of the group unless the latter either alone or in combination with other members show decidedly increased efficiency.

According to the concepts of the present invention I may use, in addition to the alkali and alkaline earth metals, generally those metals having a specific gravity of over 2.5 and the invention thus includes such metals as zinc, cadmium, aluminum, chromium, molybdenum, tungsten, iron, nickel, cobalt, lead, manganese, copper, etcetera. Salts or oxides of these metals which are given as representative of the general class are all utilizable in the pores of magnesium oxide as promoters or activators, though the degree of increase in specific catalytic efficiency which any metal compound or mixture of compounds produces will not in any case be exactly equivalent to that of the other alternative substances which may be used. This point will be more or less obvious to those familiar with catalysis in its practical aspects. While the use of salts and oxides of other heavy metals of a more rare and expensive character such as, for example, gold and silver, platinum, palladium, etc. is not precluded, their use will seldom be dictated in practice on account of their high cost and the fact that promoters of substantially the same order of activity may be selected from the cheaper and more readily obtainable members of the heavy metal group.

For practical reasons it is preferred to use the salts of the commoner acids as sources of promoters. The use of any given salt will be determined by such factors as its solubility, its ease of absorption from solution by magnesium oxide, its tendency to decomposition at moderate temperatures such as those characteristic of the present process and the nature of the compounds left after its heat treatment. Sulphates, halides, nitrates, chromates, molybdates, etc. may be employed and in the case of amphoteric metals, mixed oxide promoters may be developed upon the surface and in the pores of the magnesium oxide by controlled calcination of salts of acids containing amphoteric elements. For example, a mixture of lead and chromium oxides may be produced by the ignition of lead chromate.

In making up catalyst composites of the preferred character and composition, the following is the simplest and generally the preferred procedure. Natural magnesite is calcined at temperatures of from 800° C. (1472° F.) to 900° C. (1652° F.) to produce a mixture containing a high percentage of magnesium oxide, the oxide is then ground to produce granules of relatively small mesh and these are given the requiste amounts of promoter compounds by mixing them with aqueous solutions or suspensions of selected salts or salt mixtures. The magnesium oxide resulting from calcination has a high absorptive capacity for dissolved activating materials and readily takes up the required percentages from aqueous solutions. To insure complete absorption of salts from the solutions and at the same time a uniform distribution upon the magnesium oxide granules, the latter may be added to relatively dilute solutions of salts and these may then be concentrated until a critical point is reached corresponding to complete removal of dissolved material. At this point the solvent may be removed by filtering or pressing or evaporation by heat.

Other alternative methods of preparing the preferred composite catalysts may be employed. For example, the calcined magnesium oxide may be stirred into solutions of salts, particularly those of heavy metals and their hydrates percipitated by the addition of alkali metal hydrates or carbonates such as, for example, sodium carbonate, this serving to fix the precipitates upon the granules of magnesium oxide. Usually the mixed solid particles are then ignited to produce a mixture of oxides. When using solutions of nitrates the mixture of magnesium oxide granules and the solution may be evaporated to dryness and further heated to decompose the nitrates and produce residual oxides.

In regard to the relative proportions of magnesium oxide and promoting materials it may be stated in general that the latter are generally less that 10% by weight of the total composites. The effect upon the catalytic activity of the magnesium oxide caused by varying the percentage of any given compound or mixture of compounds deposited thereon is not a matter for exact calculation but more one for determination by experiment. Frequently good increases in catalytic effectiveness are obtainable by the deposition of as low as 1 or 2% of a promoting salt upon the surface and in the pores of the oxide, though the general average is about 5%.

In practicing the dehydrogenation of paraffinic gases according to the present process a solid composite catalyst prepared according to the foregoing alternative methods is used as a filler in a reaction tube or chamber in the form of particles of graded size or small pellets and the gas to be dehydrogenated is passed through the catalyst after being heated to the proper temperature, usually within the range of from 400 to 750° C. (752–1382° F.). The most commonly used temperatures are around 500° C. (932° F.), e. g. 900–1000° F. The catalyst tube may be heated exteriorly if desired to maintain the proper reaction temperature. The pressure employed may be atmospheric or slightly superatmospheric of the order of from 50 to 100 pounds per square inch. While pressures up to 500 pounds per square inch may be employed in some cases, pressures of the order of atmospheric are preferred. The time during which the gases are exposed to dehydrogenating conditions in the presence of the preferred catalyst is comparatively short, always below 20 seconds, and preferably as low as from 3 to 6 seconds.

The exit gases from the tube or chamber may be passed through selective absorbents to combine with or absorb the olefin or olefin mixture produced or the olefins may be selectively polymerized by suitable catalysts, caused to alkylate other hydrocarbons such as aromatics or treated directly with chemical reagents to produce desirable and commercially valuable derivatives. After the olefins have been removed the residual gases may be recycled for further dehydrogenating treatment with or without removal of hydrogen.

Members of the present group of catalysts are selective in removing two hydrogen atoms from a paraffin molecule to produce the corresponding olefin without furthering to any great degree undesirable side reactions, and because of this show an unusually long period of activity in service as will be shown in later examples. When, however, their activity begins to diminish it is readily regenerated by the simple expedient of oxidizing with air or other oxidizing gas at a moderately elevated temperature, usually within the range employed in the dehydrogenating reactions. This oxidation effectively removes traces of carbon deposits which contaminate the surface of the particles and decrease their efficiency. It is characteristic of the present types of catalysts that they may be repeatedly regenerated without loss of porosity or catalyzing efficiency.

Numerous experimental data could be adduced to indicate the results obtainable by employing the present type of catalyst to dehydrogenate paraffins, but the following single example is sufficiently characteristic.

In making up the catalyst for the process, 150 parts by weight of burnt magnesite was added to 300 parts by weight of a 1% solution of potassium dichromate and the solution was heated at from about 185 to 194° F. for one-half hour. The magnesite particles were filtered, washed with water and then gradually added to 300 parts by weight of a 4% solution of lead acetate which was held at about 194 to 203° F. for one hour. The suspension was filtered hot, washed with water and dried, the 6 to 10 mesh particles being preserved. This mode of procedure produced a magnesite activated by the deposition thereon of about 2% of lead chromate.

Using small pellets of the above oxide mixture made by moistening and compressing and later drying, isobutane was passed through a treating tower containing the pellets as filler at atmospheric pressure and temperatures of about 1112° F., with a space velocity of from 50 to 80 per hour.

The following table shows the nature of the results obtained by means of gas analyses taken at indicated times from the start of the run.

*Composition of dehydrogenated gases*

| Time after start, hours | 40 | 80 | 150 | 250 |
| --- | --- | --- | --- | --- |
| i-Butylene...........................percent.. | 24.6 | 23.5 | 24.6 | 24.6 |
| Other butylenes and propylene.....do.... | 6.3 | 5.2 | 5.4 | 5.9 |
| Ethylene..........................do.... | 2.2 | 2.3 | 4.6 | 2.1 |
| Paraffins (mainly i-butane).........do.... | 35.0 | 37.1 | 35.4 | 38.4 |
| Hydrogen..........................do.... | 31.9 | 31.9 | 30.0 | 29.0 |

From the above data it will be seen that the dehydrogenation corresponds closely to the calculated equilibrium mixture at 1112° F., which should contain approximately 33% hydrogen, 33% butane and 33% butylenes. Substantially 50% of the original isobutane was converted into olefins and hydrogen.

It is to be further observed that the catalytic activity was maintained substantially constant for the period of a run of approximately ten days.

The foregoing specification and example are sufficient to show that the invention has intrinsic value when practiced in the art, but neither is to be construed as imposing limitations upon the scope of the invention, as both are given for illustrative purposes only.

I claim as my invention:

1. A process for converting normally gaseous paraffins into olefins which comprises dehydrogenating the same in the presence of a catalytic mixture of a major proportion of magnesium oxide and a minor proportion of a metallate capable of promoting the catalytic properties of the magnesium oxide and selected from the group consisting of a chromate, molybdate, aluminate, titanate, uranate, permanganate and perrhenate.

2. A process for converting normally gaseous paraffins into olefins which comprises dehydrogenating the same in the presence of a catalytic mixture of a major proportion of magnesium oxide and a minor proportion of a molybdate.

3. A process for converting normally gaseous paraffins into olefins which comprises dehydrogenating the same in the presence of a catalytic mixture of a major proportion of magnesium oxide and a minor proportion of a titanate.

4. A process for dehydrogenating hydrocarbons which comprises subjecting the hydrocarbons under dehydrogenating conditions to the action of a magnesium oxide catalyst containing, in relatively small but sufficient amount to promote the catalytic activity of the magnesium oxide, a metallate selected from the group consisting of a chromate, molybdate, aluminate, titanate, uranate, permanganate and perrhenate.

5. A process for dehydrogenating hydrocarbons which comprises subjecting the hydrocarbons under dehydrogenating conditions to the action of a magnesium oxide catalyst containing a molybdate in relatively small but sufficient amount to promote the catalytic activity of the magnesium oxide.

6. A process for dehydrogenating hydrocarbons which comprises subjecting the hydrocarbons under dehydrogenating conditions to the action of a magnesium oxide catalyst containing a titanate in relatively small but sufficient amount to promote the catalytic activity of the magnesium oxide.

HANS TROPSCH.